US012606256B2

(12) United States Patent　　　(10) Patent No.:　　US 12,606,256 B2

Martucci　　　　　　　　　　　　　(45) Date of Patent:　　　Apr. 21, 2026

(54) REACTIVE PANEL AERODYNAMIC SYSTEM FOR VEHICLE UNDERBODY

(71) Applicant: GM GLOBAL TECHNOLOGY OPERATIONS LLC, Detroit, MI (US)

(72) Inventor: Peter Martucci, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 338 days.

(21) Appl. No.: 18/504,490

(22) Filed: Nov. 8, 2023

(65) Prior Publication Data

US 2025/0145228 A1　　May 8, 2025

(51) Int. Cl.
B62D 35/02　　　　(2006.01)

(52) U.S. Cl.
CPC ..................................... B62D 35/02 (2013.01)

(58) Field of Classification Search
CPC .......... B62D 35/02; B62D 37/02; Y02T 10/82
See application file for complete search history.

(56) References Cited

U.S. PATENT DOCUMENTS

| 5,184,832 A * | 2/1993 | Miwa | ................... | B62D 35/007 |
| | | | | 296/180.1 |
| 9,481,407 B2 * | 11/2016 | Rettig | ................... | B62D 35/001 |

| 9,957,000 B1 * | 5/2018 | Ehirim | ................. | B62D 35/007 |
| 12,187,357 B2 * | 1/2025 | Ando | ..................... | B62D 37/02 |
| 12,371,109 B2 * | 7/2025 | Nakayama | ........... | B62D 35/005 |
| 2013/0238198 A1 * | 9/2013 | Prentice | ................. | B62D 35/02 |
| | | | | 296/180.1 |
| 2020/0010128 A1 * | 1/2020 | Herlem | .................. | B62D 35/02 |
| 2022/0234531 A1 * | 7/2022 | Andre | .................... | B62D 35/02 |

FOREIGN PATENT DOCUMENTS

| DE | 102013225083 A1 * | 6/2015 | ............. | B62D 35/02 |
| DE | 102019101294 A1 | 7/2020 | | |
| EP | 2476565 A1 * | 7/2012 | ............. | B60G 7/001 |
| FR | 2961468 A1 * | 12/2011 | ............. | B62D 35/02 |
| GB | 2511912 A * | 9/2014 | .......... | B62D 35/001 |
| JP | 2006076441 A * | 3/2006 | | |
| WO | WO-2015043866 A1 * | 4/2015 | ............. | B60G 7/001 |

* cited by examiner

*Primary Examiner* — Paul N Dickson

(74) *Attorney, Agent, or Firm* — Ingrassia Fisher & Lorenz, LLP | IF&L

(57)　　　　　　　ABSTRACT

An aerodynamic system for a vehicle that includes a structure. The structure includes a body that defines an underbody. The vehicle includes an assembly that moves relative to the body. A panel system is coupled with the underbody and includes an aerodynamic panel defining an opening and a reactive panel that closes the opening. The aerodynamic panel is coupled with the body at the underbody. The reactive panel moves in response to contact by the assembly and returns to close the opening when released by the assembly.

20 Claims, 5 Drawing Sheets

REACTIVE PANEL AERODYNAMIC SYSTEM FOR VEHICLE UNDERBODY

INTRODUCTION

The present disclosure generally relates to panels for effecting desirable exterior vehicle airflow, and more particularly relates to an underbody panel for a vehicle that provides optimized aerodynamics and that reacts to jounce and other events by moving to permit a full range of suspension system travel.

The aerodynamic performance of a moving land vehicle is a factor of various parameters such as drag, downforce, lateral force and lift. The parameters are influenced by the exterior shape and features of the vehicle which contribute to the vehicle's drag coefficient. Drag and lift may be significantly influenced by the underbody features of the vehicle. Drag and lift tend to increase significantly as operating speed increases.

Various types of aerodynamic devices and structures may be used to effect changes in airflow around a vehicle. Airfoils may be used to create pressure differentials and are sometimes adapted as wings with smooth, shaped and angled surfaces to reduce drag or create downforce, when desired. An air dam may be used to divert air from travelling under the vehicle to decrease lift but may increase the total frontal area of the vehicle. A spoiler is designed to reduce lift and increase normal force but may considerably increase drag. The various devices change/deflect air movement over and around the body of a vehicle in motion to effect desirable outcomes. Various aerodynamic devices may be used to accomplish a purpose but may also create an increased, undesirable drag force.

Accordingly, it is desirable to provide aerodynamic device configurations for optimal performance with respect to the lift and drag. Furthermore, other desirable features and characteristics of the present invention will become apparent from the subsequent detailed description and the appended claims, taken in conjunction with the accompanying drawings and the foregoing introduction.

SUMMARY

A number of embodiments include an aerodynamic system for a vehicle that has a defined structure. The structure includes a body that defines an underbody. The vehicle includes an assembly that moves relative to the body. A panel system is coupled with the underbody and includes an aerodynamic panel defining an opening and includes a reactive panel that closes the opening. The aerodynamic panel is coupled with the body at the underbody. The reactive panel moves in response to contact by the assembly and returns to close the opening when released by the assembly.

In additional embodiments, the reactive panel is coupled with the aerodynamic panel by a hinge.

In additional embodiments, a spring is coupled between the reactive panel and the aerodynamic panel.

In additional embodiments, the aerodynamic panel includes a step and the reactive panel includes a rearward side that nests within the step.

In additional embodiments, the assembly includes a suspension assembly that includes a suspension arm, which effects the contact with the reactive panel by the assembly.

In additional embodiments, the reactive panel includes a forward side and a rearward side. A hinge couples the reactive panel to the aerodynamic panel and is disposed at the forward side.

In additional embodiments, the assembly includes a suspension assembly. A wheel assembly is coupled with the structure by the suspension assembly. The reactive panel reacts to movement of the wheel assembly.

In additional embodiments, the reactive panel and the aerodynamic panel are assembled together as a unit.

In additional embodiments, the assembly includes a suspension arm that contacts the reactive panel and that operates to separate from and move away from the reactive panel.

In additional embodiments, a diffuser panel in the panel system, wherein the diffuser panel is disposed rearward of the aerodynamic panel, wherein the diffuser panel is separated from the reactive panel by the aerodynamic panel.

In a number of additional embodiments, an aerodynamic system for a vehicle includes a structure of the vehicle including a body defining an underbody. The underbody channels an airflow component under the vehicle. An assembly is disposed to move relative to the body. A panel system is coupled with the underbody and includes an aerodynamic panel defining an opening and a reactive panel that closes the opening. The aerodynamic panel is fixed to the body at the underbody. The reactive panel moves in response to contact by the assembly and returns to close the opening when released by the assembly. The aerodynamic panel and the reactive panel present a substantially continuous surface without gaps to the airflow component.

In additional embodiments, the reactive panel is rotatably fixed to the aerodynamic panel by a hinge.

In additional embodiments, a spring connects to the reactive panel and to the aerodynamic panel. The spring biases the reactive panel to close the opening.

In additional embodiments, the aerodynamic panel includes a step. The reactive panel includes a rearward side nesting within the step when the reactive panel closes the opening.

In additional embodiments, the assembly includes a suspension assembly that includes a lower control arm that effects the contact of the reactive panel by the assembly.

In additional embodiments, the reactive panel includes a forward side and a rearward side. A hinge couples the reactive panel to the aerodynamic panel. The hinge is disposed at the forward side. The rearward side separates from the aerodynamic panel by rotation of the reactive panel about the hinge.

In additional embodiments, the assembly includes a suspension assembly with a wheel assembly coupled with the structure through the suspension assembly. The reactive panel reacts to jounce events of the wheel assembly.

In additional embodiments, the reactive panel and the aerodynamic panel are assembled together as a unit, prior to assembly to the vehicle.

In additional embodiments, the assembly includes a suspension assembly with a lower control arm that moves to contact the reactive panel for movement through a plane of the panel system and to separate from and move away from and above the reactive panel.

In a number of other embodiments, an aerodynamic system for a vehicle includes a structure of the vehicle including a body defining an underbody. The underbody channels an airflow component under the vehicle. A suspension assembly moves relative to the body. A panel system is coupled with the underbody and includes an aerodynamic panel defining an opening and a reactive panel that closes the opening. The aerodynamic panel is fixed to the body at the underbody. The reactive panel is disposed in a position separated from the structure by the aerodynamic panel, moves in response to contact by the suspension assembly, and returns to close the opening when released by the suspension assembly. The aerodynamic panel and the reactive panel direct the airflow component along the underbody and around the suspension system.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Figure 1:
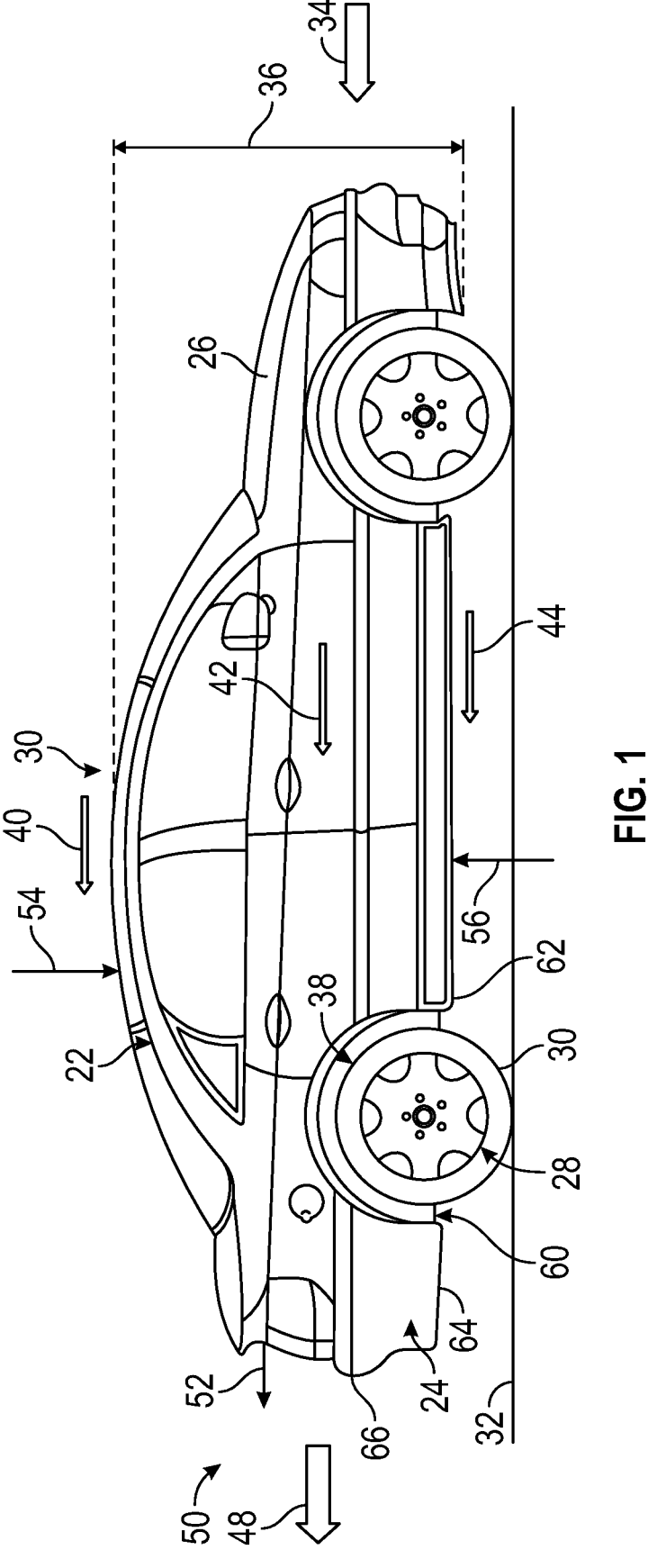
FIG. 1 is a schematic diagram of a vehicle, in accordance with various embodiments.

With reference to FIG. 1, illustrated is one example of a vehicle aerodynamic system 20 as implemented in a vehicle 22. As depicted in FIG. 1, the vehicle 22 generally includes a structure 24 including a body 26, supported on wheel assemblies 28, such as by a suspension assembly 38. The structure 24 may be of various types that define a physical shape for desired purposes. The body 26 substantially encloses components of the vehicle 22 and defines exterior surfaces, and the wheel assemblies 28 are each rotationally coupled near a respective corner of the body 26. In various embodiments, the vehicle 22 may be a front wheel drive vehicle, a rear wheel drive vehicle or an all-wheel drive vehicle with any number of wheels, however other drive arrangements are contemplated. The vehicle 22 operates using forces generated as a result of traction due to friction between tires 30 of the wheel assemblies 28 and a roadway 32. Propulsion of the vehicle 22 may be provided by any of a number of propulsion system types such as electric, combustion, hybrid, or others.

As the vehicle 22 moves on the roadway 32, in this case in a forward direction, airflow 34 is displaced by the frontal area 36 of the structure 24/body 26. The airflow 34 is generally divided into a component 40 that travels over the top of the body 26, components 42 that travel around the left and right sides of the body 26, and an airflow component 44 that travels under the body 26 along the underbody 46. Behind the vehicle 22, the airflow components 40, 42, 44 rejoin in an airflow 48 in a wake zone 50 that may include turbulence. The airflows 34, 48 and the airflow components 40, 42, 44 result in forces acting on the vehicle including a drag force 52, a downforce 54 and a lift force 56. The magnitudes of these forces are a function of the exterior features of the vehicle 22 and the speed of the vehicle 22. The aerodynamic system 20 is configured to reflect desired effects on the forces. For example, the drag force 52 may be minimized by contouring of the body 26 for increased efficiency, such as in terms of electric range or fuel economy.

Regarding the underbody 46, the airflow component 44 may contribute to the drag force 52, such by encountering any downward projecting features and any open areas where air may circulate and/or become trapped producing a kind of parachute effect. Accordingly, the aerodynamic system 20 may include a panel system 60 that provides a smooth, relatively flat surface 62 along which the airflow component 44 moves reducing/minimizing drag. The panel system 60 may include a panel 62 at the underbody 46 in the vicinity of the rear wheel assemblies 28 to reduce drag force 52. In addition, the panel system 60 may include a diffuser panel 64. The diffuser panel 64 is configured to reduce the drag force 52 and the lift force 56 near the rear 66 of the body 26. The diffuser panel 64 is sloped upward in the rearward direction to expand the flow component 44 underneath the vehicle 22. Accelerating the flow component 44 reduces the air pressure near the rear 66 of the vehicle 22 reducing lift. The higher pressure forces air rearward from under the vehicle 22 filling the wake zone 50 and reducing the drag force 52 on the vehicle 22.

Figure 2:
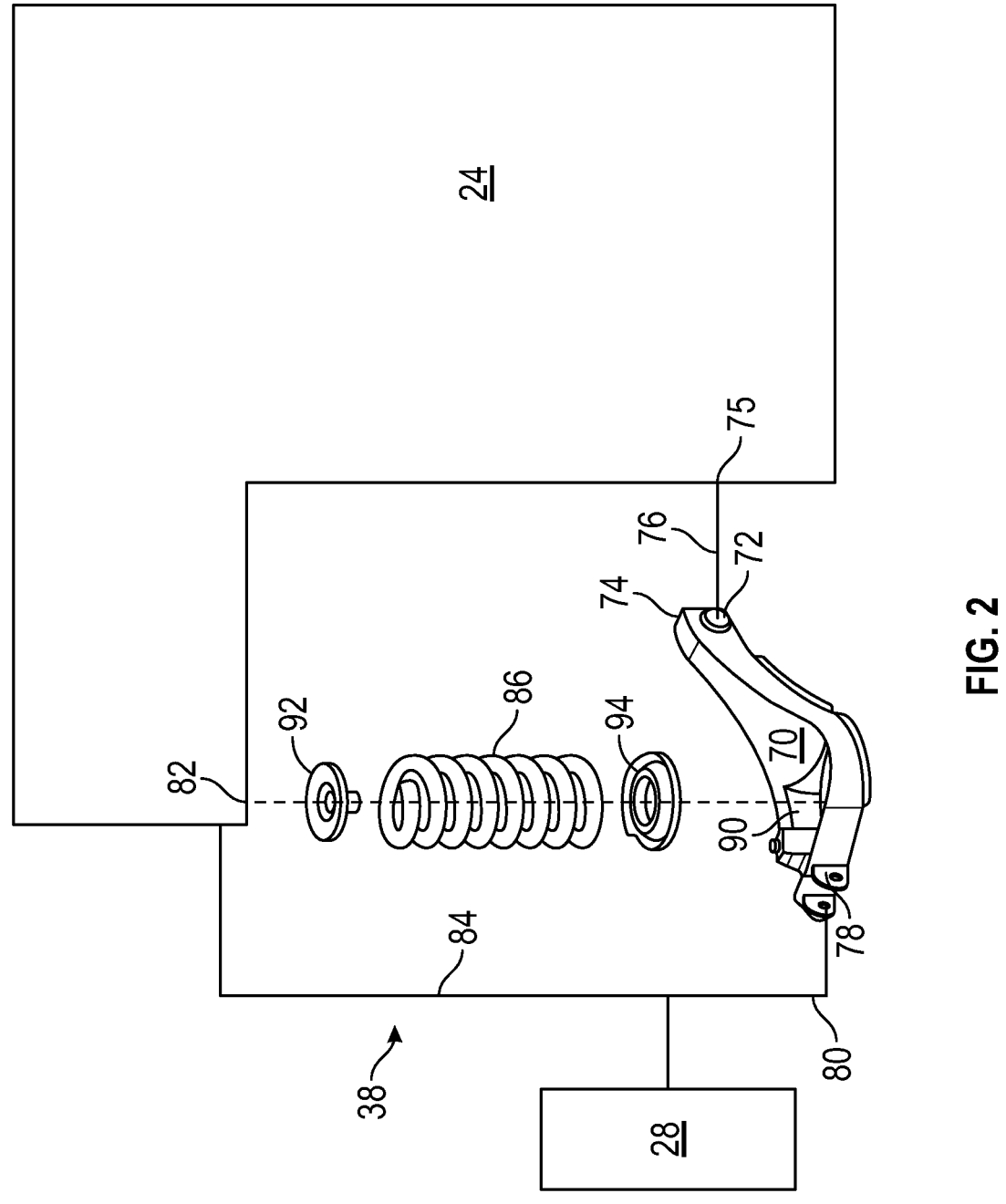
FIG. 2 is a fragmentary, schematic diagram illustrating one rear suspension corner of the vehicle of FIG. 1, in accordance with various embodiments.

Referring to FIG. 2, select aspects of one corner of the suspension assembly 38 are illustrated. The suspension assembly 38 allows the wheel assembly 28 to move vertically relative to the structure 24. In this example the corner is a rear corner of the vehicle 22 with the wheel assembly 28 suspended on the structure 24 of the vehicle 22 by components of the suspension assembly 38. As illustrated, the suspension assembly 38 includes a suspension arm 70, which is embodied as a lower control arm. In other embodiments, the suspension arm 70 may take another form, such as plural arms or another form of link. The suspension arm 70 includes a pivot 72 near its inboard end 74 that is connected to the structure 24 at a point 75, either directly, such as by a pin 76, or indirectly by intervening elements/links. The inboard end 74 is therefore rotatable but held in a generally fixed vertical position relative to the structure 24. Rotation allows the outboard end 78 of the suspension arm 70 to move vertically relative to the structure 24 and relative to the body 26 of the vehicle 22, and also allows the wheel assembly 28 to move vertically relative to the structure 24 and the body 26.

The outboard end 78 of the suspension arm 70 is connected to the wheel assembly 28 through a link 80. The link 80 may be include a hub (not shown) with a bearing housing and other components to rotataby connect with the wheel assembly 28. The wheel assembly 28 is also coupled with the structure 24 at a point 82 that is vertically higher than the point 75 so that the suspension assembly 38 prevents excessive tilt of the wheel assembly 28 relative to vertical. The wheel assembly 28 is coupled to the point 82 by a link 84 that may be one or more suspension arms, or another form of linkage.

The suspension assembly 38 includes a spring 86 that holds the structure 24 as a sprung mass on the wheel assemblies 28. In this example, the spring 86 is embodied as a coil spring that extends between a point 88 on the structure 24 and a seat 90 on the suspension arm 70. In other embodiments, another type of spring element may be used. A resilient spring seat 92 may be positioned between the upper end of the spring 86 and the structure 24. In addition, a resilient spring seat 94 may be positioned between the lower end of the spring 86 and the suspension arm 70. The suspension assembly 38 may include other components, such as a damper (not shown). Due to movement of the wheel assembly 28 during operation of the vehicle 22, the suspension arm 70 moves up and down relative to the structure 24 and therefore needs clearance from other components to move.

Figure 3:
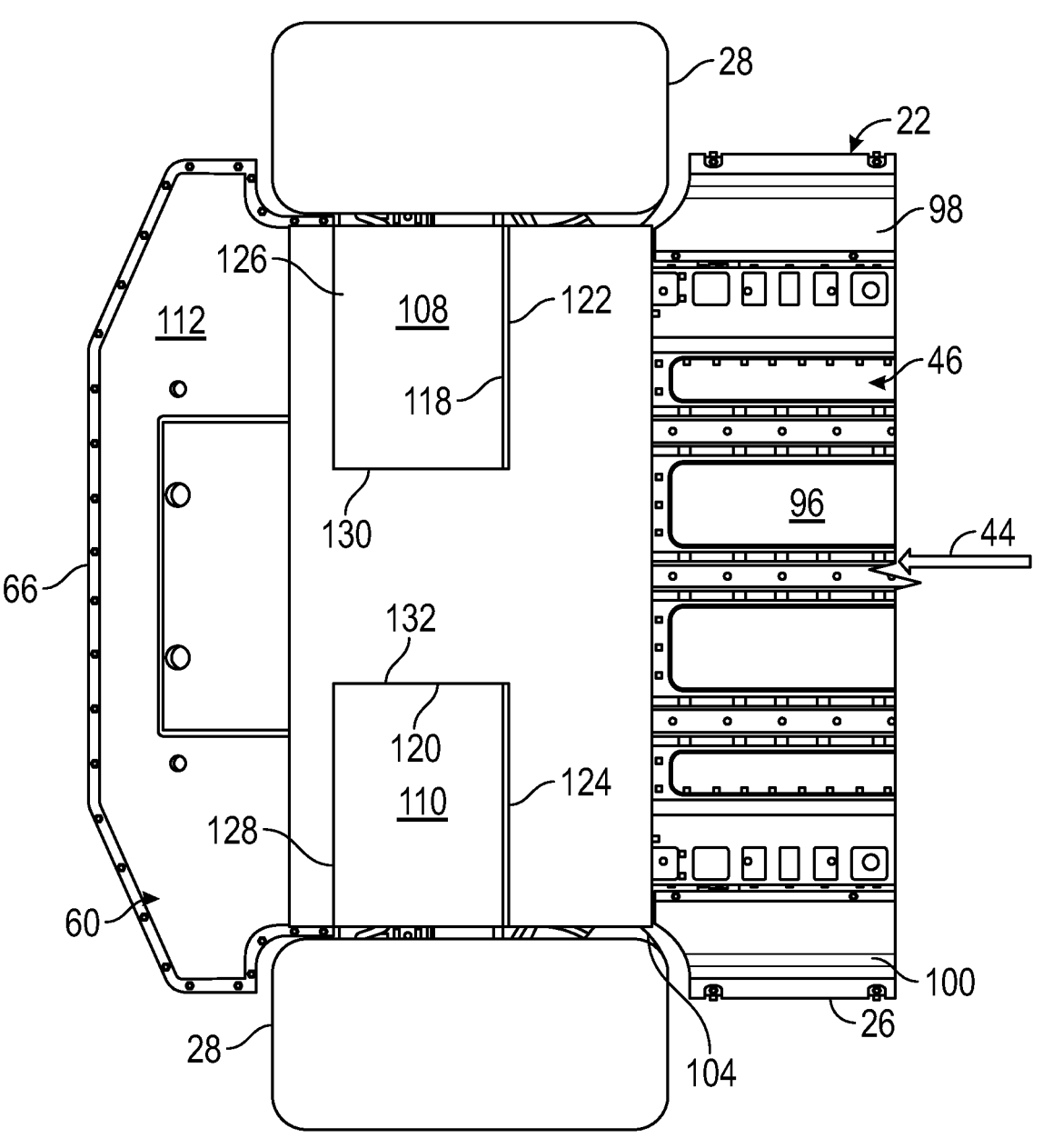
FIG. 3 is a fragmentary, schematic illustration of the rear underbody area of the vehicle of FIG. 1, in accordance with various embodiments.

Referring to FIG. 3, the rear portion of the vehicle 22 is shown from below, viewing the rear part of the underbody 46. The area of the underbody 46 forward of the rear wheel assemblies 28 is covered by a floor pan 96 of the body 26. The floor pan 96 is generally located under the passenger compartment of the vehicle 22 and is a relatively flat clear structure over which air flows with little resistance. The floor pan 96 extends laterally across the body 26 between rocker panels 98, 100. In an area 104 of the vehicle 22 rearward from the floor pan 96 and between the wheel assemblies 28, the body 26 has an elevated floor 102 (shown in FIG. 4). The area 104 may contain various features of the vehicle 22. For example, components of the suspension assembly 38, a rear drive unit, exhaust system components, fuel/energy storage components, and/or other components may be disposed in the area 104 depending on the type of powertrain in the vehicle 22 and the vehicle's configuration.

Because of the elevated floor 102 and the features of the vehicle 22 contained in the area 104, various air disturbances, resistances and aerodynamic inefficiencies may arise if not for the aerodynamic system 20 of the present disclosure. Specifically, the underbody 46 of the vehicle 22, and in this embodiment the part thereof rearward of the floor pan 96, is covered by components of the panel system 60. These components include an aerodynamic panel 106, that may be referred to as a rear drive unit panel in some embodiments, two reactive panels 108, 110, and a diffuser panel 112. The components of the panel system 60 may be formed of a variety of materials and in the current embodiment are made of polymer material for light weight and sufficient rigidity and durability for the environment.

The area 104 (at its bottom) is generally covered by the aerodynamic panel 106 and the reactive panels 108, 110. The aerodynamic panel 106 is fixed in position to the structure 24 such as to the body 26 and is disposed substantially at the height of the floor pan 96 so as to be a rearward extension thereof. The aerodynamic panel 106 may be affixed by fasteners so that it is selectively removable. The reactive panels 108, 110 fill/close openings 118, 120, respectively of the aerodynamic panel 106, may be substantially flat, and are disposed at, or substantially at, the same height as the aerodynamic panel 106. The aerodynamic panel 106 and the reactive panels 108, 110 provide a substantially flat, smooth surface along which the airflow component 44 that travels under the body 26 along the underbody 46 does so efficiently. The reactive panels 108, 110 react to movement of a feature of the vehicle 22 and, for example, open under contact by the moving feature to provide clearance for the moving feature to pass through the panel system 60 as described in more detail below.

In this embodiment, the aerodynamic panel 106 surrounds each of the reactive panels 108, 110 on three sides. Specifically, the aerodynamic panel 106 extends along the forward sides 122, 124, along the rearward sides 126, 128, and along the inboard sides 131, 132 of the reactive panels 108, 110, respectively. In this way, the aerodynamic panel 106 defines the openings 118, 120 in a way that provides a consistent space within which the reactive panels 108, 110 are received and can be maintained at the desired height with minimal or no gaps. In some embodiments, the aerodynamic panel 106 may surround a different number of the sides of the reactive panel 108. For example, the diffuser panel 112 may be disposed along the rearward side 126, or the aerodynamic panel 106 may surround all sides of the reactive panels 108, 110. The various sides may also be referred to herein as edges of the reactive panels 108, 110. Surrounding the various sides of the reactive panels 108, 110 with the aerodynamic panel 106 provides the ability to control the mating relationship between the panels and enables minimizing or eliminating gaps to maximize aerodynamic efficiency.

The diffuser panel 112 is disposed rearward of the aerodynamic panel 106 and mates with the aerodynamic panel 106 at the same/substantially same height, and may be angled slightly upward in a direction rearward of the aerodynamic panel 106 to the rear 66 of the vehicle 22. The diffuser panel 112 may be configured to lower pressure and reduce lift. In addition, the diffuser panel 112 may prevent spaces and structures from creating a parachuting effect. The angle of the diffuser panel 112 may be tuned relative to horizontal to provide a desired amount of lift reduction (downforce) without unduly increasing drag. The airflow component 44 that travels under the body 26 along the underbody 46 passes along the floor pan 96, the aerodynamic panel 106, and the reactive panels 108, 110 with little disturbance and high efficiency and then passes along the diffuser panel 112 for beneficial aerodynamics before passing behind the vehicle 22 to the wake zone 50. This provides an optimized underbody 46 with a smooth structure uninterrupted by openings and projecting features with the suspension assembly 38 tucked up out of the airflow component 44 in most operating conditions of the vehicle 22.

Figure 4:
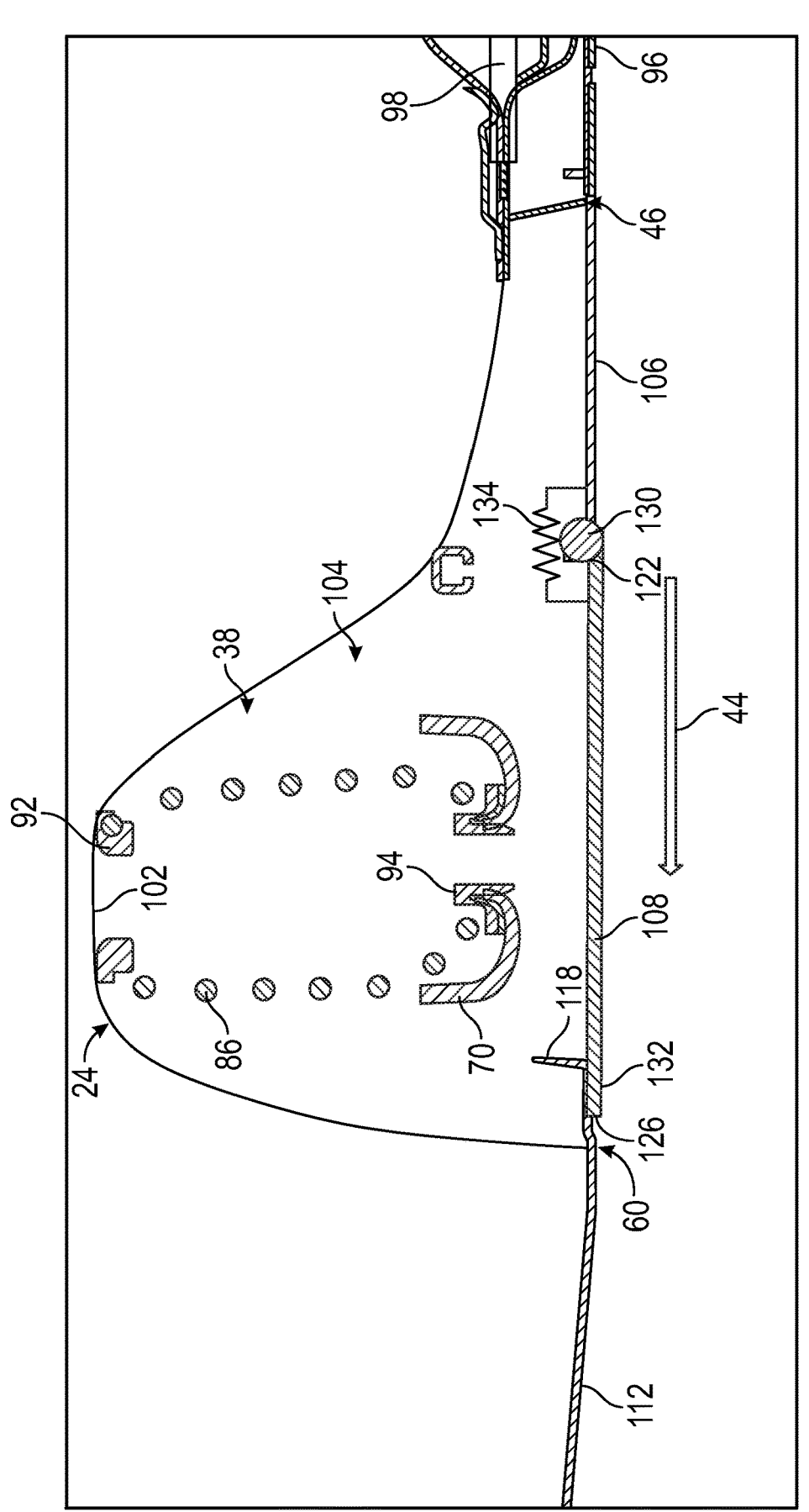
FIG. 4 is a sectional, fragmentary, schematic illustration of the rear suspension corner area of the vehicle of FIG. 1 with a reactive panel in a first state, in accordance with various embodiments.

Referring to FIG. 4, the part of the vehicle 22 around the area 104 is shown schematically in sectioned view, with select parts of the vehicle 22 illustrated. The suspension assembly 38 and in particular the suspension arm 70 and the spring 86, are disposed in the area 104 below the elevated floor 102 and generally at a height above the panel system 60. In general, the area 104 is a substantially enclosed space and the airflow component 44 travels under the panel system 60 without interacting with the space or the components within the area 104.

The reactive panel 108 is disposed within and closes the opening 118. The forward side 122 of the reactive panel 108 is connected with the aerodynamic panel 106 by a hinge 130. The rearward side 126 of the reactive panel 108 nests within a step 132 in the aerodynamic panel 106 so that a smooth surface is provided between the reactive panel 108 and the aerodynamic panel 106 with no gap for maximizing aerodynamic efficiency. The rearward side 126 is not coupled with the aerodynamic panel 106 but is held in position in the step 132 against the aerodynamic panel 106 by a spring 134. The spring 134 extends between the reactive panel 108 and the aerodynamic panel 106 and allows the reactive panel to rotate (CCW as viewed) about the hinge 130 when a downward force is applied to the reactive panel 108. In the current embodiment, the spring 134 is a coil spring. In other embodiments, another type of spring may be used. For example, an extension, torsion or spiral spring, or a flexible element may be used. During operation of the vehicle 22 due to forces imparted from the roadway 32, the part of the suspension arm 70 shown in FIG. 4 moves vertically and the spring 86 expands and contracts, with the suspension arm 70 rotating about the link 76 (shown in FIG. 2). For the majority of operating conditions of the vehicle 22, the suspension arm 70 moves above the reactive panel 108, which remains in its aerodynamically efficient position with the rearward side 126 against the aerodynamic panel 106 in the step 132. In some embodiments, plural hinges 130 and/or plural springs 134 may be used with the reactive panel 108. The reactive panel 110 is configured and operates similar to the reactive panel 108.

Figure 5:
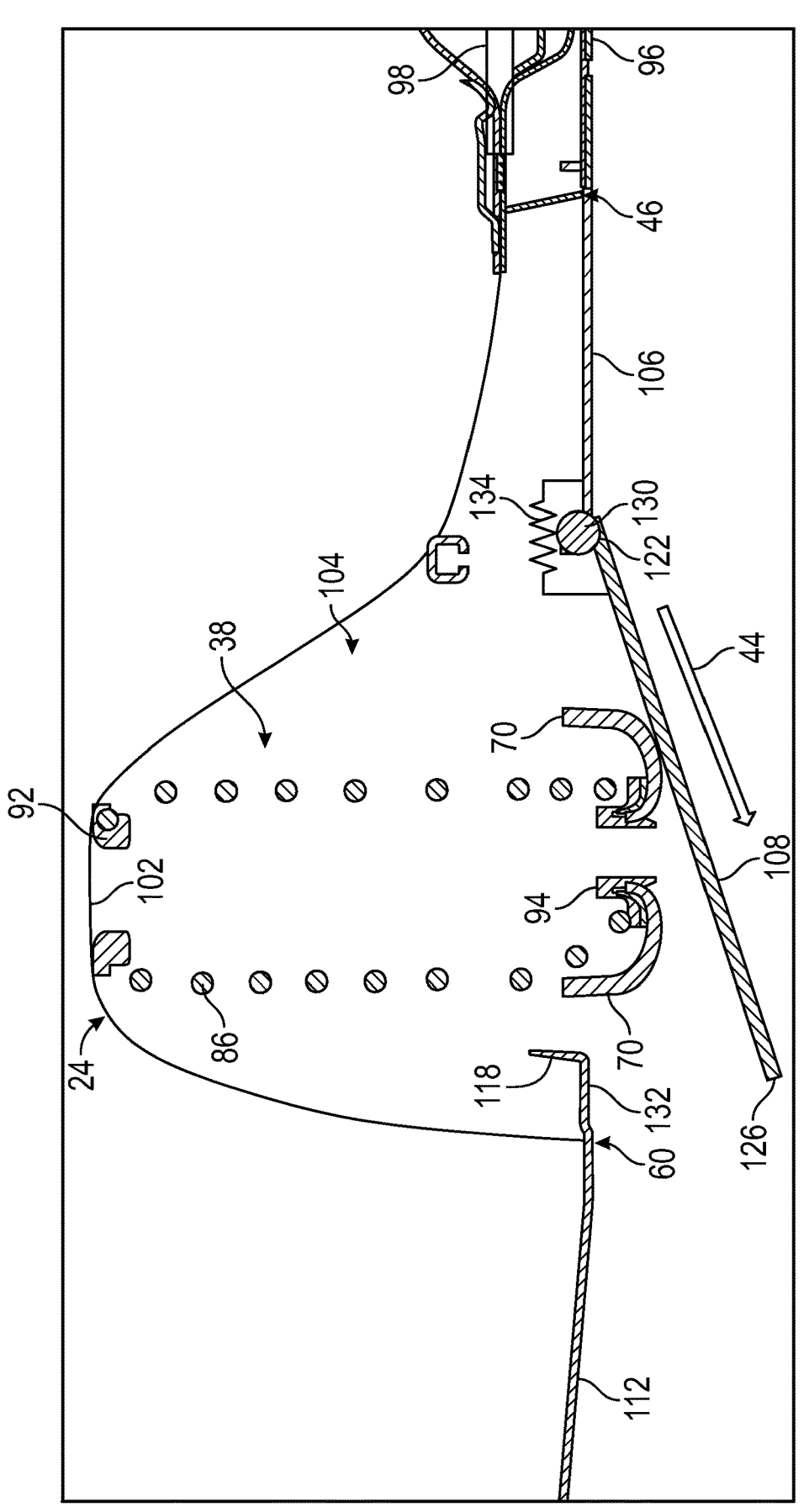
FIG. 5 is a sectional, fragmentary, schematic illustration of the rear suspension corner area of the vehicle of FIG. 1 with the reactive panel in a second state, in accordance with various embodiments.

As shown in FIG. 5, during certain operating conditions of the vehicle 22, such as during a substantial jounce event where the wheel assembly 28 moves away from the structure 24, the suspension arm 70 contacts the reactive panel 108 applying a downward force thereto. As a result, the reactive panel 108 overcomes the force applied by the spring 134 and rotates about the hinge 130. The rearward side 126 of the reactive panel 108 separates from the step 132. This allows the suspension arm 70 to pass into and/or through the opening 118. The reactive panel 108 moves only that amount necessary to accommodate the amount of movement needed for the suspension arm 70. The reactive panel 108 may operate as a kind of trap-door mechanism that opens to allow movement of the suspension arm 70 and self-closes when the suspension arm 70 moves back into the area 104 and releases from the reactive panel 108. The reactive panel 108 moves under contact by the suspension assembly 38 (in this embodiment by the suspension arm 70) and returns to close the opening 118 when released by the suspension assembly 38. The suspension arm 70 is allowed to move vertically below the plane of the panel system 60, when needed and aerodynamic efficiency is optimized. Locating the hinge 130 at the leading edges (e.g., forward side 122) of the reactive panels 108, 110 avoids a parachuting condition and instead the reactive panels 108, 110 direct the airflow component 44 along their surfaces. The reactive panel 110 operates in a manner similar to that of the reactive panel 108 to accommodate movements at the opposite side of the vehicle 22.

The reactive panels 108, 110 are fully supported by and mate with the aerodynamic panel 106. The hinge 130 and the spring 134 are connected to the aerodynamic panel 106. As a result, the aerodynamic panel 106 and the reactive panels 108, 110 may be preassemble as a unit in a subassembly and then assembled to the vehicle 22 in one operation. In some embodiments, the spring 134 may connect between the reactive panel 108 and the structure 24. In some embodiments, the aerodynamic panel 106 may surround all four sides of the reactive panel 108. In some embodiments, the reactive panel 108 may have a different shape to accommodate the size and shape of the feature (such as the suspension arm 70) that will move through the opening 118. The reactive panels 108, 110 may also accommodate movement of the suspension arms 70 when the vehicle 22 is raised on a hoist and the wheel assemblies 28 move downward away from the body 26. The reactive panels 108 may be manually opened for inspection and maintenance purposes, without removing the panel system 60. In some embodiments, the diffuser panel 112 may be included in a subassembly with the aerodynamic panel 106 and the reactive panels 108, 110 before being assembled to the vehicle 22. In some embodiments, the diffuser panel 112 may be fabricated together with the aerodynamic panel 106 as one piece. In some embodiments, rather than the spring 134, another biasing mechanism may be used to moveably hold the reactive panels 108, 110 closed and to allow them to open to provide clearance for movement of a feature of the vehicle 22. For example, rather than a separate spring the reactive panels 108, 110 may be fully or partially made of a flexible material. If trim height adjustments are needed to the vehicle 22, they may be made without redesigning the panel system 60. The reactive panels 108, 110 may be located at any point of the underbody 46 of the vehicle 22 to accommodate potential movement of a feature through the panel system 60. Accordingly, an aerodynamically efficient underbody 46 is provided including across the area occupied by the suspension arms 70.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An aerodynamic system for a vehicle comprising:
   a structure of the vehicle including a body defining an underbody;
   a suspension assembly configured to move relative to the body during operation of the vehicle; and
   a panel system coupled with the underbody including an aerodynamic panel defining an opening and a reactive panel configured to close the opening,
   wherein the suspension assembly is configured to contact the reactive panel and to separate from and move away from the reactive panel,
   wherein the aerodynamic panel is coupled with the body at the underbody,
   wherein the reactive panel is configured to move in response to contact by the suspension assembly and is configured to close the opening when released by the suspension assembly.

2. The aerodynamic system of claim 1, wherein the reactive panel is coupled with the aerodynamic panel by a hinge.

3. The aerodynamic system of claim 1, comprising a spring coupled between the reactive panel and the aerodynamic panel.

4. The aerodynamic system of claim 1, wherein the aerodynamic panel includes a step, wherein the reactive panel includes a rearward side configured to nest within the step.

5. The aerodynamic system of claim 1, wherein the suspension assembly includes a suspension arm that effects the contact with the reactive panel by the suspension assembly.

6. The aerodynamic system of claim 1, wherein the reactive panel includes a forward side and a rearward side, and comprising a hinge coupling the reactive panel to the aerodynamic panel, the hinge disposed at the forward side.

7. The aerodynamic system of claim 1, comprising a wheel assembly coupled with the structure by the suspension assembly, wherein the reactive panel is configured to react to movement of the wheel assembly.

8. The aerodynamic system of claim 1, wherein the reactive panel and the aerodynamic panel are assembled together as a unit.

9. The aerodynamic system of claim 1, wherein the suspension assembly comprises a suspension arm that is configured to move through the opening during a jounce event of the suspension assembly.

10. The aerodynamic system of claim 1, comprising a diffuser panel in the panel system, wherein the diffuser panel is disposed rearward of the aerodynamic panel, wherein the diffuser panel is separated from the reactive panel by the aerodynamic panel.

11. An aerodynamic system for a vehicle comprising:

a structure of the vehicle including a body defining an underbody, the underbody configured to channel an airflow component under the vehicle;

an assembly configured to move relative to the body;

a panel system coupled with the underbody including an aerodynamic panel defining an opening and a reactive panel configured to close the opening; and a suspension arm included as part of the assembly and configured to contact the reactive panel and to separate from and move away from the reactive panel, wherein the aerodynamic panel is fixed to the body at the underbody, wherein the reactive panel is configured to move in response to contact by the suspension arm and is configured to close the opening when released by the assembly, wherein the aerodynamic panel and the reactive panel present a substantially continuous surface without gaps to the airflow component.

12. The aerodynamic system of claim 11, wherein the reactive panel is rotatably fixed to the aerodynamic panel by a hinge.

13. The aerodynamic system of claim 11, comprising a spring connected to the reactive panel and to the aerodynamic panel, wherein the spring is configured to bias the reactive panel to close the opening.

14. The aerodynamic system of claim 11, wherein the aerodynamic panel includes a step, wherein the reactive panel includes a rearward side nesting within the step when the reactive panel closes the opening.

15. The aerodynamic system of claim 11, wherein the assembly comprises a suspension assembly, wherein the suspension assembly includes a lower control arm that effects the contact of the reactive panel by the assembly.

16. The aerodynamic system of claim 11, wherein the reactive panel includes a forward side and a rearward side, and comprising a hinge coupling the reactive panel to the aerodynamic panel, the hinge disposed at the forward side, wherein the rearward side is configured to separate from the aerodynamic panel by rotation of the reactive panel about the hinge.

17. The aerodynamic system of claim 11, wherein the assembly comprises a suspension assembly, and comprising a wheel assembly coupled with the structure through the suspension assembly, wherein the reactive panel is configured to react to jounce events of the wheel assembly.

18. The aerodynamic system of claim 11, wherein the reactive panel and the aerodynamic panel are configured to be assembled together as a unit, prior to assembly to the vehicle.

19. The aerodynamic system of claim 11, wherein the suspension arm is configured to move through the opening during a jounce event of the assembly.

20. An aerodynamic system for a vehicle comprising:

a structure of the vehicle including a body defining an underbody, the underbody configured to channel an airflow component under the vehicle;

an assembly configured to move relative to the body, wherein the assembly comprises a suspension assembly;

a panel system coupled with the underbody including an aerodynamic panel defining an opening and a reactive panel configured to close the opening; and a suspension arm included as part of the assembly and configured to contact the reactive panel and to separate from and move away from the reactive panel, wherein the aerodynamic panel is fixed to the body at the underbody, wherein the reactive panel is disposed in a position separated from the structure by the aerodynamic panel and is configured to move in response to contact by the suspension assembly and is configured to close the opening when released by the suspension arm, wherein the aerodynamic panel and the reactive panel are configured to direct the airflow component along the underbody and around the suspension assembly.

* * * * *